United States Patent

Pai et al.

[11] 4,273,846
[45] Jun. 16, 1981

[54] IMAGING MEMBER HAVING A CHARGE TRANSPORT LAYER OF A TERPHENYL DIAMINE AND A POLYCARBONATE RESIN

[75] Inventors: Damodar M. Pai, Fairport; S. Richard Turner; John F. Yanus, both of Webster; Dale S. Renfer, Rochester; Milan Stolka, Fairport, all of N.Y.

[73] Assignee: Xerox Corporation, Stamford, Conn.

[21] Appl. No.: 97,024

[22] Filed: Nov. 23, 1979

[51] Int. Cl.³ .................. G03G 5/10; G03G 5/14
[52] U.S. Cl. ............................. 430/59; 430/58
[58] Field of Search ...................... 430/59, 58, 64

[56] References Cited

U.S. PATENT DOCUMENTS

| | | | |
|---|---|---|---|
| 4,047,949 | 9/1977 | Horgan | 430/59 |
| 4,078,925 | 3/1978 | Horgan | 430/59 |

Primary Examiner—P. E. Willis, Jr.
Assistant Examiner—John L. Goodrow

[57] ABSTRACT

An imaging member comprising a charge generation layer comprising a layer of photoconductive material and a contiguous charge transport layer of a polycarbonate resin material having dispersed therein from about 25 to about 75 percent by weight of one or more diamine compound having the general formula:

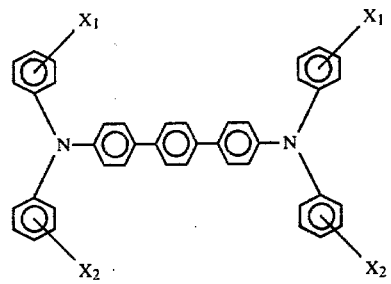

wherein $X_1$ and $X_2$ are independently selected from the group consisting of a lower alkyl group having from 1 to about 4 carbon atoms, chlorine in the ortho, meta or para position, a para phenyl group and combinations thereof.

9 Claims, 1 Drawing Figure

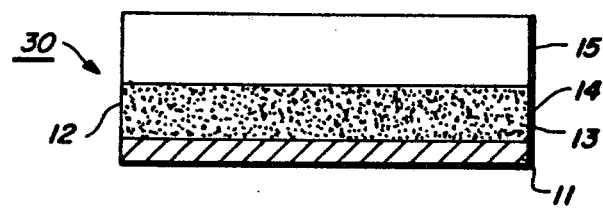

IMAGING MEMBER HAVING A CHARGE TRANSPORT LAYER OF A TERPHENYL DIAMINE AND A POLYCARBONATE RESIN

BACKGROUND OF THE INVENTION

This invention relates in general to xerography and more specifically to a novel photosensitive device.

In the art of more or less conventional xerography, a xerographic plate containing a photoconductive insulating layer is imaged by first uniformly electrostatically charging its surface. The plate is then exposed to a pattern of activating electromagnetic radiation such as light, which selectively dissipates charge in the illuminated areas of the photoconductive insulator resulting in a latent electrostatic image corresponding to the pattern of light-struck and nonlight-struck areas. The latent electrostatic image may then be developed to form a visible image by depositing finely divided electroscopic marking particles on the surface of the photoconductive insulating layer.

In recent years, interest has been shown in flexible electrophotographic plates for use in high speed office copying machines. Some of these plates are multilayered devices comprising, a conductive substrate, an adhesive blocking interface layer, a charge generation layer and a charge transport layer. The charge transport layer comprises an organic charge transport molecule dissolved or dispersed in a polymeric matrix material. This layer is substantially nonabsorbing in the spectral region of intended use, i.e. visible light, but is "active" in that it allows (1) injection of photogenerated charge from the charge generation layer and (2) efficient transport of these charges to the surface of the transport layer to discharge a surface charge thereon.

One of the parameters limiting the performance of these structures is the charge carrier mobility in the charge transport layer. When a structure such as this is employed in the above-described xerographic process, during the exposure step light is absorbed in the photogenerator layer creating free charge carriers. These charge carriers are then injected into and transported across the charge transport layer to the surface thereof. The charge carrier mobility or the velocity determines the time of transit across the transport layer. The maximum discharge of the light exposed area is obtained if the injected charge carrier has completely traversed the transport layer before the photoreceptor belt arrives at the development station. In materials with low charge carrier mobilities, the carrier will be part way through the charge transport layer when the photoreceptor belt arrives at the development station giving rise to less than maximum discharge of the photoreceptor.

The art is constantly searching for charge transport layers having high carrier mobility so that the time between exposure and development can be reduced without sacrificing xerographic efficiency. By reducing this time period, faster machines are possible.

OBJECTS OF THE INVENTION

It is therefore an object of the invention to provide a novel photosensitive device having a charge transport layer capable of highly efficient transport of injected charges.

It is a further object of this invention to provide an electrophotographic device which permits faster machine operation.

PRIOR ART STATEMENT

In U.S. Pat. No. 4,078,925, there is disclosed classes of charge transport compounds which may be added to inactive polymeric matrix materials for use as a charge transport layer in an electrophotographic imaging member. It is believed that this is the prior art most pertinent to the instant invention.

SUMMARY OF THE INVENTION

The foregoing objects and others are accomplished in accordance with this invention by providing a photoconductive member having at least two operative layers. The first layer comprises a layer of photoconductive material which is capable of photogenerating and injecting photogenerated holes into a contiguous or adjacent charge transport layer. The charge transport layer comprises a polycarbonate resin material having dissolved therein from about 25 to about 75 percent by weight of one or more compounds having the general formula:

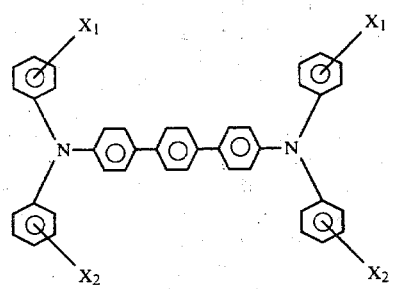

wherein $X_1$ and $X_2$ are independently selected from the group consisting of a lower alkyl group having from 1 to about 4 carbon atoms (e.g. methyl, ethyl, propyl, isopropyl, isobutyl, tert-butyl, n-butyl, etc.), chlorine in the ortho, meta or para position, a para phenyl group and combinations thereof. At least two of the phenyl substituents on the N atoms must be substituted with said alkyl group, said chlorine atom, said para phenyl group or a combination of these substituents.

Included within this structure are the following compounds: N,N'-diphenyl-N,N'-bis(3-methylphenyl)[p-terphenyl]-4,4''-diamine; N,N'-bis-(2-methylphenyl)-N,N'-bis[4-(1-butyl)phenyl]-[p-terphenyl]-4,4''-diamine; N,N'-diphenyl-N,N'-bis(4-methylphenyl)[p-terphenyl]-4,4''-diamine; N,N'-bis(biphenyl)-N,N'-(3-methylphenyl)[p-terphenyl]-4,4''-diamine; N,N'-diphenyl-N,N'-bis(3-chlorophenyl)[p-terphenyl]-4,4''-diamine.

BRIEF DESCRIPTION OF THE DRAWING

The FIGURE is a schematic illustration of one of the members of the instant invention which comprise a photoreceptor having a charge generation layer overcoated with a charge transport layer.

DETAILED DESCRIPTION OF THE DRAWING

Referring to the FIGURE, reference character 30 designates an imaging member which comprises a supporting substrate 11 having a charge generation layer 12 thereon. Substrate 11 is preferably comprised of any suitable conductive material. Typical conductors comprise aluminum, steel, nickel, brass or the like. The substrate may be rigid or flexible and of any convenient thickness. Typical substrates include flexible belts of sleeves, sheets, webs, plates, cylinders and drums. The substrate or support may also comprise a composite structure such as a thin conductive coating contained on a paper base; a plastic coated with a thin conductive layer such as aluminum, nickel or copper iodine; or glass coated with a thin conductive coating of chromium or tin oxide.

In addition, if desired, an electrically insulating substrate may be used. In this case, an electric charge, equivalent to a conductive layer, may be placed upon the insulating member by double corona charging techniques well known and disclosed in the art. Other modifications using an insulating substrate or no substrate at all include placing the imaging member on a conductive backing member or plate in charging the surface while in contact with said backing member. Subsequent to imaging, the imaging member may then be stripped from the conductive backing.

Generator layer 12 contains photoconductive particles dispersed randomly without orientation in binder 14. Binder material 14 may comprise any electrically insulating resin such as those disclosed in Middleton et al U.S. Pat. No. 3,121,006. Specific examples are polystyrene, acrylic and methacrylic ester polymers, polyvinylchlorides, etc. When using an electrically inactive or insulating resin, it is essential that there be particle-to-particle contact between the photoconductive particles. This necessitates that the photoconductive material be present in an amount of at least 10 percent by volume of the binder layer with no limit on the maximum amount of photoconductor in the binder layer. If the matrix or binder comprises an active material, e.g. poly-N-vinylcarbazole, the photoconductive material need only comprise about 1 percent or less by volume of the binder layer with no limit on the maximum amount of photoconductor in the binder layer. The thickness of binder layer 12 is not critical. Layer thicknesses from about 0.05 to 40.0 microns have been found to be satisfactory.

The photoconductive particles 13 may be any material capable of photogenerating holes and injecting photogenerated holes into the contiguous charge transport layer 15. Any suitable inorganic or organic photoconductor and mixtures thereof may be employed. Inorganic materials include inorganic crystalline photoconductive compounds and inorganic photoconductive glasses. Typical inorganic compounds include cadmium sulfoselenide, cadmium selenide, cadmium sulfide and mixtures thereof. Typical inorganic photoconductive glasses include amorphous selenium and selenium alloys such as selenium-tellurium, selunium-tellurium-arsenic and selenium-arsenic and mixtures thereof. Selenium may also be used in a crystalline form known as trigonal selenium. Typical organic photoconductive materials which may be used as charge generators include phthalocyanine pigment such as the X-form of metal free phthalocyanine described in U.S. Pat. No. 3,357,989 to Byrne et al; metal phthalocyanines such as copper phthalocyanine; quinacridones available from duPont under the tradename Monastral Red, Monastral Violet and Monastral Red Y; substituted 2,4-diaminotriazines disclosed by Weinberger in U.S. Pat. No. 3,445,227; triphenodioxazines disclosed by Weinberger in U.S. Pat. No. 3,442,781; polynuclear aromatic quinones available from Allied Chemical Corporation under the tradename Indo Double Scarlet, Indofast Violet Lake B, Indofast Brilliant Scarlet and Indofast Orange. The photoconductive particles may be present in the generator layer in from 0.5 percent to about 95 percent by volume depending upon the character of the binder material.

It is to be understood that the generator layer need not be dispersed in photoconductive particles in a resin binder, but can be a homogeneous layer, such as, amorphous selenium, selenium alloys, e.g. selenium-tellurium-arsenic alloys and, in fact, any other charge generating photoconductive material which can withstand a minimum flexing stress required in a flexible photoreceptor.

Active layer 15 comprises a transparent electrically inactive polycarbonate resinous material having dispersed therein from about 25 to 75 percent by weight of one or more of the diamines within the scope of the structure formula defined above. In general, the thickness of active layer 15 is from about 5 to 100 microns, but thicknesses outside this range can also be used.

The preferred polycarbonate resins for the transport layer have a molecular weight of from about 20,000 to about 120,000 more preferably from about 50,000 to 120,000. Materials most preferred as the electrically inactive resinous material are poly(4,4″-isopropylidenediphenylene carbonate) having molecular weights of from about 25,000 to about 40,000, available as Lexan ® 145, and from about 40,000 to about 45,000, available as Lexan ® 141, both the General Electric Company; and from about 50,000 to about 120,000, available as Makrolon ® from Farbenfabricken Bayer AG; and from about 20,000 to about 50,000, available as Merlon ® from Mobay Chemical Company. The diamines of the instant invention are soluble to an unusually high degree which appears to account in part for the high rate of discharge of the devices herein.

Active layer 15 as described above, is substantially nonabsorbing to light in the wavelength region employed to generate holes in the photoconductive layer. This preferred range for xerographic utility is from about 4000 to about 8000 angstrom units. In addition, the photoconductor should be responsive to all wavelengths from 4000 to 8000 angstrom units if panchromatic responses are required. All photoconductor-active material combinations of the instant invention shall result in the injection and subsequent transport of holes across the physical interface between the photoconductor and the active material.

The following examples further specifically define the present invention with respect to the method of making the photosensitive member. The percentages are by weight unless otherwise indicated.

EXAMPLE I

Preparation of
N,N′-bis(3-methylphenyl)-N,N′-bis[4-(1-butyl)phenyl]-[p-terphenyl]-4,4″-diamine A 250 ml three necked round bottom flask equipped with a mechanical stirrer and purged with argon was charged witn 14.34 grams (0.06 moles) of 3-methyl-4″-(1-butyl)diphenylamine, 9.64 grams (0.02 moles) of 4,4″-diiodoterphenyl, 15 grams (0.11 moles) of potassium carbonate, 10 grams of copper bronze and 50 milliliters of $C_{13}$–$C_{15}$ aliphatic hydrocarbons, i.e. Soltrol ® 170 (Phillips Chemical Company). The mixture was heated for 18 hours at 210° C. The product was isolated by the addition of 200 mls of n-octane and hot filtered to remove inorganic solids. The product crystallized out on cooling and was isolated by filtration. Treatment with alumina yielded pure N,N′-bis(3-methylphenyl)-N,N′- bis[4-(1-butyl)-phenyl]-[p-terphenyl]-4,4''-diamine in approximately 75% yield.

EXAMPLE II

A 0.5 micron thick layer of amorphous selenium is vapor deposited on a 3 mil aluminum substrate by a conventional vacuum deposition technique such as those disclosed in Bixby in U.S. Pat. No. 2,753,278 and 2,970,906. Prior to evaporating the amorphous selenium on the substrate, a 0.5 micron layer of an epoxy phenolic barrier layer is formed over the aluminum by dip coating. Vacuum deposition is carried out at a vacuum of $10^6$ Torr, while the substrate is maintained at a temperature of about 50° C. during the vacuum deposition. The charge transport layer is prepared by dissolving 0.3 grams of Makrolon ® polycarbonate and 0.2 grams of the diamine of Example I in 3 milliliters of methylene chloride. A 25 micron thick layer of this solution is overcoated onto the amorphous selenium surface. The resulting device is heated at 40° C. for 16 hours to remove volatiles.

The device is xerographically tested as follows: the device is corona charged to a negative potential of 1,200 volts and is subjected to a light flash of 4330 angstrom wavelength and approximately 10 ergs/per centimeter intensity. The duration of exposure was about 2 microseconds. The device "instantly" (i.e. within the 5 millisecond response time of the recorder) discharged to 0 volts. This device was employed to make excellent reproductions on a Xerox Model D copier.

EXAMPLE III

N,N'-bis(3-methylphenyl)-N,N'-diphenyl-[p-terphenyl]-4,4''-diamine was prepared by the process of Example I employing 10.98 grams of 3-methyl diphenylamine in place of the 3-methyl-4''-(1-butyl) diphenylamine. This compound was employed as the charge transport molecule in preparing an electrophotographic plate using a ratio of polycarbonate to diamine of 3:1 which is otherwise the same as that of Example II. The resulting device was tested as in the preceeding example and it exhibited the same immediate discharge characteristics.

The invention has been described in detail with particular reference to preferred embodiments thereof but it will be understood that variations and modifications can be effected within the spirit and scope of the invention as described hereinabove and as defined in the appended claims.

What is claimed is:

1. An imaging member comprising a charge generation layer comprising a layer of photoconductive material and a contiguous charge transport layer of an electrically inactive polycarbonate resin material having dispersed therein from about 25 to about 75 percent by weight of one or more diamine compound having the general formula:

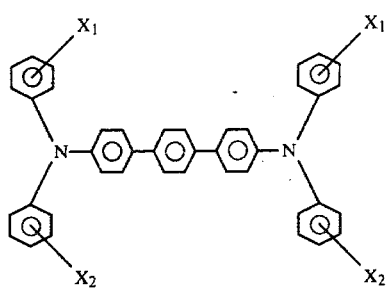

wherein $X_1$ and $X_2$ are independently selected from the group consisting of a lower alkyl group having from 1 to about 4 carbon atoms, chlorine in the ortho, meta or para position, a para phenyl group and combinations thereof, said photoconductive layer exhibiting the capability of photogeneration of holes and injection of said holes and said charge transport layer being substantially nonabsorbing in the spectral region at which the photoconductive layer generates and injects photogenerated holes but being capable of supporting the injection of photogenerated holes from said photoconductive layer and transporting said holes through said charge transport layer.

2. The member of claim 1 wherein the polycarbonate resin has a molecular weight of from about 20,000 to about 120,000.

3. The member of claim 2 wherein the polycarbonate is poly(4,4''-isopropylidene-diphenylene carbonate).

4. The member according to claim 3 wherein the polycarbonate has a molecular weight between from about 25,000 to about 45,000.

5. The member according to claim 3 wherein the polycarbonate has a molecular weight of from about 50,000 to about 120,000.

6. The member of claim 1 wherein the photoconductive material is selected from the group consisting of amorphous selenium, trigonal selenium, and selenium alloys selected from the group consisting of selenium-tellurium, selenium-tellurium-arsenic, selenium-arsenic and mixtures thereof.

7. The member of claim 5 wherein the photoconductive material is selected from the group consisting of amorphous selenium, trigonal selenium, and selenium alloys selected from the group consisting of selenium-tellurium, selenium-tellurium-arsenic, selenium-arsenic and mixtures thereof.

8. The member of claim 7 wherein the diamine compound is N,N'-diphenyl-N,N'-bis(3-methylphenyl)[p-terphenyl]-4,4''-diamine.

9. The member of claim 7 wherein the diamine compound is N,N'-bis(2-methylphenyl)-N,N'-bis[4-(1-butyl)phenyl]-[p-terphenyl]-4,4''-diamine.

* * * * *